Oct. 21, 1969 S. BLOECK 3,473,971
PROCESS FOR PRODUCING INORGANIC LAYERS ON METALLIC ARTICLES
Filed July 19, 1966
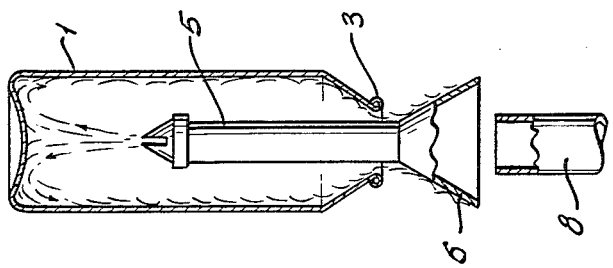
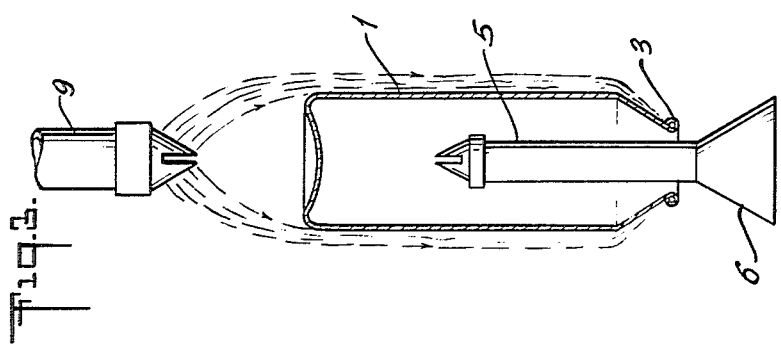
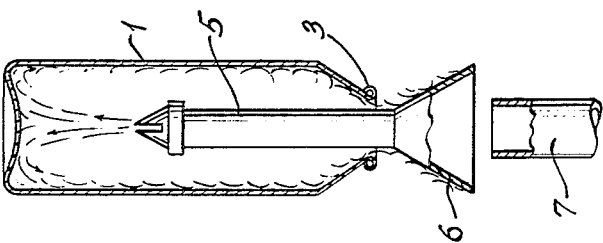
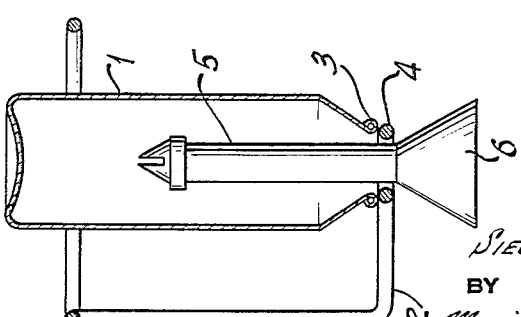
INVENTOR:
SIEGFRIED BLOECK
BY
Morrison, Kennedy & Campbell
ATTORNEYS.

United States Patent Office 3,473,971
Patented Oct. 21, 1969

3,473,971
PROCESS OF PRODUCING INORGANIC LAYERS
ON METALLIC ARTICLES
Siegfried Bloeck, Singen, Hohentwiel, Germany, assignor
to Swiss Aluminium Ltd., Chippis, Switzerland, a joint-
stock company of Switzerland
Filed July 19, 1966, Ser. No. 566,302
Claims priority, application Switzerland, Aug. 2, 1965,
10,849/65
Int. Cl. C23f 7/06
U.S. Cl. 148—6.27                                    1 Claim

ABSTRACT OF THE DISCLOSURE

The invention is concerned with a process of producing a layer of aluminum-oxide-hydroxide on an aluminum article by spraying with an aqueous solution of triethanolamine of 70 to 90° C. The article is sprayed for only a short time in order to moisten the article with the solution and keeping the moistened article at a temperature of 70 to 90° C. for a time sufficient to form the desired layer in an atmosphere saturated with water vapor without further spraying.

---

Several processes are known to produce inorganic layers on metallic articles by treating them in a hot aqueous solution. According to the kind and composition of this aqueous solution, chromate, phosphate, or oxide layers are formed. They serve as corrosion-inhibiting protective layers or as adhesion-improving layers for organic coatings.

If such a layer is desired on one side of the article only, the treatment has to be performed by spraying. There are other cases too where spraying is preferred to dipping. It has been found however, that the jets of the spraying solution have an erosive effect on the growing layer, which is a distinct disadvantage. The forming of the layer would nevertheless be possible, without danger of erosion, after the spraying treatment if the surfaces were sufficiently moistened and the article maintained, without further spraying, at the temperature necessary for the forming of the layer. At this elevated temperature however, an irregular concentration of the solution takes place on the surface of the article leading to too high a concentration and even to an irregular drying of the solution, occurrences detrimental to the formation of a good, homogeneous layer.

It is also known that erosion of the growing layer does not occur if the treating solution is allowed to react on the article in the form of a mist. The production of the misty atmosphere however needs a more complicated apparatus than the spraying. Besides, the heat capacity of the mist is not sufficiently high, so that additional heating appliances are necessary. Moreover, the treatment of one surface only is not feasible in this way.

The present invention avoids these disadvantages. For this purpose the metallic articles on which inorganic layers have to be formed by treatment with a hot aqueous solution are moistened by the aqueous solution and then kept at the temperature necessary for the forming of the layer in an atmosphere saturated or even supersaturated with steam—i.e. hot water vapor. In this way, the solution remaining on the surface of the article after moistening produces the inorganic layer without any mechanical influence by spraying jets. Moreover the solution has no possibility to dry, as the surrounding atmosphere is saturated with steam. The moistening with the reactive solution may be performed in a well-known manner, e.g. by dipping or spraying, the surface having been primarily cleaned and pickled. This method is particularly advantageous when layers of aluminium-oxide-hydroxide are to be formed on aluminium and especially when such layers have to be formed on the interim of hollow bodies, e.g. cans, where the layers serve to improve the adhesion of lacquers. These layers called "Böhmit" layers are, by preference, produced by heating the aluminium article in a hot, alkaline aqueous solution, e.g. of 0.15% by weight triethanolamine. During their stage of formation these layers are insufficiently resistant to abrasion so that erosion will occur when the treating solution is sprayed onto the article. On the other hand these layers cannot be produced by dipping, either in cases where only the inside of a can has to be coated, or where dipping is not feasible because of the apparatus available. In this event the inside of the hollow body is, according to the invention, moistened by the spraying of aqueous solution. The forming of the layer is performed subsequently in a steam-saturated atmosphere at the necessary temperature, e.g. in a stove with controlled atmosphere.

In a special embodiment of the invention the hollow body, the interior of which has been moistened, is kept at the temperature necessary for the forming of the layer by irrigating its exterior with hot water. Alternatively, the can may be kept at this necessary temperature in a misty atmosphere produced from the hot aqueous solution, so that a layer is formed on the outside of the hollow body as well. The misty atmosphere may also be produced by spraying the solution against baffle plates but care has to be taken to avoid jets of the solution directly hitting the surface of the article as this would have an erosive effect on the growing layer.

In the annexed drawing, which serves to exemplify and explain a process by which a layer is formed on the inner side of a can in accordance with the invention.

FIG. 1 is a diagrammatic side view illustrating a can in place on an interior spray nozzle;

FIG. 2 shows schematically the nozzle juxtaposed to a treating-solution supply pipe;

FIG. 3 shows the can under an irrigating shower means; and

FIG. 4 shows schematically the interior spray nozzle juxtaposed to a rinse-water supply pipe.

In FIG. 1, a can 1 to be treated is set with its opening downward in the can fixing device 2, this being, for example, connected to a conveying device (not shown). The can 1 stands with the brim 3 of its opening on the ring 4 of the can fixing device 2. An interior spray nozzle 5, having a funnel-shaped base 6, is connected to the can fixing device. The base 6 is adapted to be set first over a supply pipe 7 and later over a supply pipe 8. In FIG. 2, the spray nozzle 5 is set over the supply pipe 7 by the can fixing device. The supply pipe 7 supplies the treating solution to be sprayed inside the can as shown. For treating aluminum cans an aqueous solution of triethanolamine of 0.05 to 1% by weight at 70 to 90° C. is sprayed, e.g. during three seconds. Afterwards the can, complete with the spray nozzle, is moved to the position shown in FIG. 3 where its exterior is irrigated for 15 to 60 seconds with the water at 70 to 90° C. coming from the shower means 9. During this last operation, the Böhmit layer is formed on the interior of the can. The concentration of the solution, the time of reaction and the temperature in relation to each other are controlled according to the desired thickness of the layer. The spraying operation shown in FIG. 2 leaves a stream-saturated atmosphere inside the can. Its exterior is also surrounded by the steam-saturated atmosphere from the irrigation with hot water. The treating solution is therefore not permitted to dry.

In the position of FIG. 4 the interior of the can is rinsed with deionized water coming from the supply pipe 8 through the spray nozzle 5 in order to remove any surplus of the treating solution. Subsequently the can is dried.

In this way a homogeneous layer is produced which serves to improve the adhesion of a subsequently applied lacquer and thereby helps to improve the stability of this lacquer coating. After the layer has been formed in the position of FIG. 3 it is sufficiently resistant to abrasion so that it may be rinsed by spraying with water.

What is claimed is:

1. A process of producing a layer of aluminium-oxide-hydroxide on aluminum article by spraying with an aqueous solution of 0.05–1% by weight triethanolamine at a temperature of 70 to 90° C. in which the article is sprayed for only a short time with said solution in order to moisten the article and keeping the moistened article at a temperature of 70 to 90° C. for a time sufficient to form the desired layer in an atmosphere saturated with water vapor without further spraying.

References Cited

UNITED STATES PATENTS 3,365,325  1/1968  Fraenkel et al. ____ 264—173 X

FOREIGN PATENTS 985,300  3/1965  Great Britain.

ALFRED L. LEAVITT, Primary Examiner

C. R. WILSON, Assistant Examiner

U.S. Cl. X.R.

117—97